Patented Dec. 27, 1938

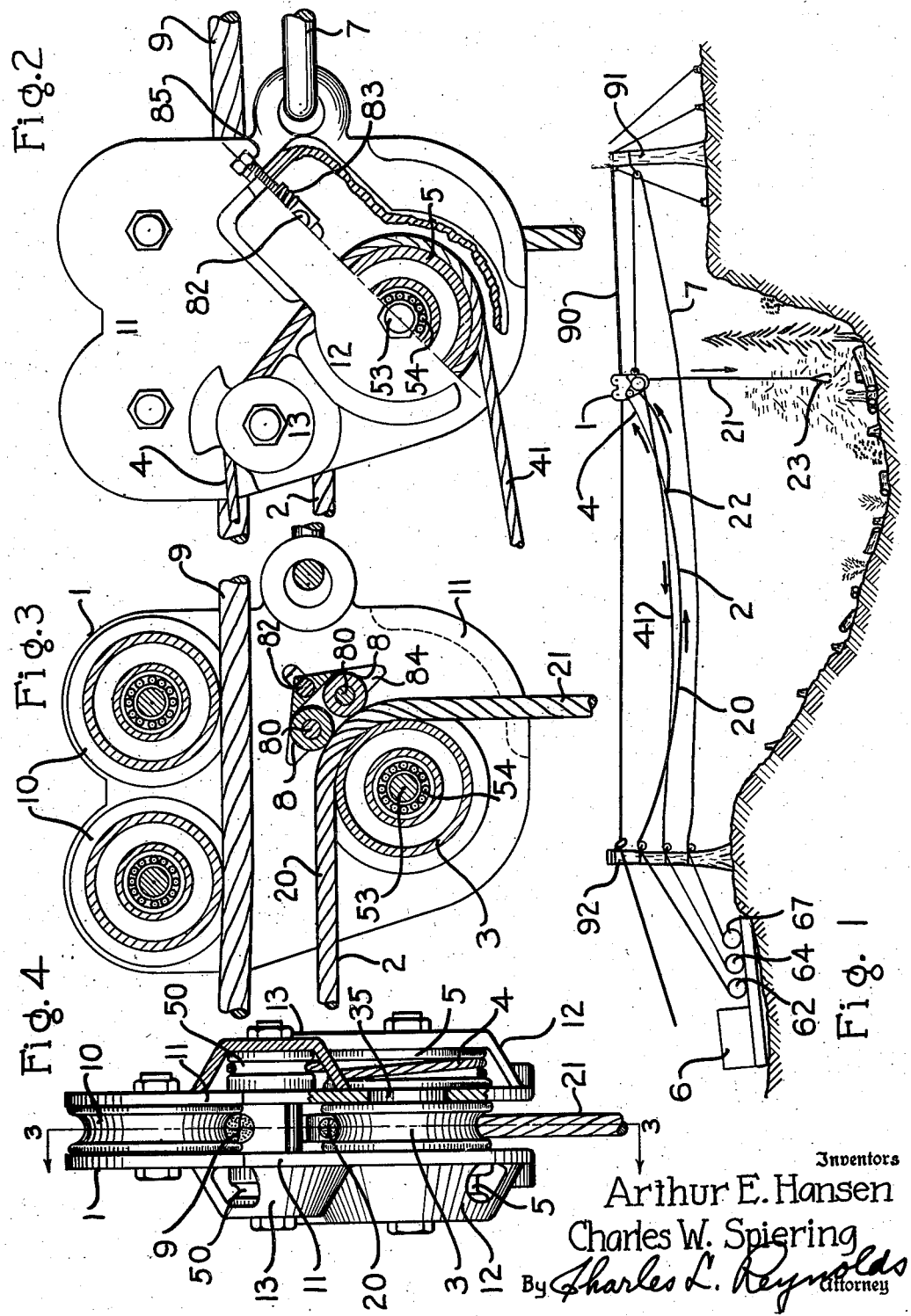

2,141,469

UNITED STATES PATENT OFFICE 2,141,469

TONG LINE CONTROL FOR SKIDDER CARRIAGES

Arthur E. Hansen, Seattle, Wash., and Charles W. Spiering, Portland, Oreg., assignors to Young Iron Works, Seattle, Wash., a corporation of Washington Application November 2, 1937, Serial No. 172,394

10 Claims. (Cl. 212—89)

The present invention relates to carriages for handling logs in a cableway system, and is an improvement upon carriages of the general type known as skidder carriages.

In logging operations, using rigging and a carriage of this general type, a carriage moves along an elevated cableway and carries a tong line sheave, over which passes a tong line, which is a hoisting line having at the end of its lower run a pair of hooks or tongs, or equivalent devices for engaging and lifting logs, the tong line having a lateral run or skidding line extending to a drum on the donkey or winch, by which the carriage and logs are hauled in. A back haul line is connected to the carriage, extending beyond it to or beyond its most distant point on the cableway and back to a drum on the donkey.

Such carriages operate over a considerable distance, and the empty tong line must be lowered to the ground by its own weight and the weight of the tongs for engagement with the logs. Sometimes it must be lowered into deep ravines or gullies. When the carriage has been hauled back, with the hooks raised, to the point where the tong line is to be lowered, the weight of the tong line between the carriage and the donkey is many times heavier than the empty tong line end with the hooks, and in consequence the hooks will not then drop by their own weight. A slack puller line must be employed to pull the tong line toward the carriage and to allow the hooks to be lowered. Such a slack puller line is fastened to the tong line some distance ahead of the carriage, is then passed over a sheave in the carriage, and then to a drum on the donkey. The slack puller line sheave is fastened to and revolves with the tong line sheave, and rollers, which are positioned to engage the tong line and to forcibly hold the latter into the sheave groove (usually positioned above the tong line sheave), provide the traction for starting the hooks or tongs downward when the heaviest weight balance is ahead of the carriage. These rollers also retard the sudden dropping of the vertical run of the tong line and the hooks when the weight of the hooks and lowered line overbalances the slack front portion of the tong line, and creates a tendency for the hooks to fall of their own weight plus the weight of the vertical run of the tong line.

Skidder carriages previously known employ such arrangements, but in existing skidder carriages the rollers are held in contact with the tong line sheave by means of the engineer's control of the line, and by effecting relative movement between the rollers and the sheave, one or the other being movable to bring the rollers and tong line and sheave into contact. By holding the haul-back line taut and pulling the slack puller line the rollers and tong line sheave are brought close together in these existing carriages. This is a source of danger to men working below, for should either line be momentarily slack, allowing the rollers and tong line sheave to separate, and should the greater weight be on the hook side of the carriage, it will cause the hooks to drop suddenly to the ground. In other arrangements heretofore proposed, while the slack puller line sheave is positively connected to drive the tong line sheave, there is no means provided to assure adequate tractional engagement of the tong line with its sheave. Hence, it is futile to rotate the tong line sheave positively from the slack puller line sheave, when there is no assurance that the tong line will run over its sheave at all, or at any rate of speed corresponding to the rate of rotation of its sheave. For instance, if the empty tongs are drawn up to the carriage, and it is desired to lower them, no matter how positively the tong line sheave is rotated, the tongs still can not be lowered unless the frictional grip (which can not be relied upon under all circumstances) between the tong line and its sheave is adequate, or unless some positive means of assuring traction is provided, as it is in this invention. Again, if the frictional grip between the tong line and its sheave is sufficient to start lowering the tongs, such frictional grip may be insufficient to prevent the tong line, after its weight overcomes the weight of its slack, from sliding more rapidly past its sheave, and dropping substantially without restraint. The frictional grip may be increased by taking several wraps of the tong line about its sheave or drum, but this is destructive in that such a heavy steel cable should not be bent through one or several complete wraps of such short radius as the sheave's, and run thereabout with a heavy load and at any speed. Moreover, the cable in passing about several wraps must necessarily shift axially of the drum's periphery, with attendant friction. The frictional grip may be somewhat increased by wedging the tong line in a V-grooved sheave, but this also is destructive in that it produces friction of the line on the flanges or walls of the groove in entering and in leaving. It is seen that it is insufficient, ineffective and harmful merely to drive the tong line sheave positively, if there is no positive and substantially frictionless means to effect a driving engagement between the tong line and its sheave.

It is one of the objects of the present invention to provide a carriage of the general type indicated, which will provide thorough and accurate control at all times of the tong line, without reliance on the engineer, to the end of preventing the possibility of the tongs dropping uncontrolled, and to provide such a device which is equally effective with either long or short tong lines.

It is necessary every few days to change cableways from one location to another. This requires lowering and often dropping the carriage and dragging it over stumps, logs and rough ground. Should there be any operative parts not protected by the main housings or the cheek plates of the carriage, such parts are subject to damage when being handled in this manner, and it is an object of this invention to simplify the construction of such a carriage, and in particular to make it more rugged and reliable when so handled, and to lessen its cost.

Moreover the sudden impact of bringing the rollers and tong line sheave together, in present carriages, where they are relatively movable, is detrimental to the ball or roller bearings, for very considerable impact forces are generated in this way, and it is a further object of the invention to eliminate this source of damage or wear to the carriage, and to simplify its construction and lessen its cost of manufacture and of maintenance, by causing the rollers to have a constant even pressure on the tong line sheave at all times.

It is a further object to provide a carriage of the general type indicated in which, while there is some tendency while pulling slack to tilt the carriage on the trackway cable or skyline, produces a minimum of such tendency, and therefore produces the minimum of wear on the cables, due to their rubbing on the flanges of the sheaves.

More specifically, it is a further object to provide in such a carriage means which will constantly press or hold the tong line in tractive engagement with its sheave, and to arrange such means in such a way that they are accessible readily for inspection or replacement.

Our invention, then, comprises the novel carriage, and the novel combination and arrangement of parts thereof, and particularly such a carriage as is intended for use in the cableway system illustrated, all as shown in the accompanying drawing and as will be described in this specification and more particularly defined by the claims terminating the same.

In the accompanying drawing we have shown our invention embodied in a form which is at present preferred by us.

Figure 1 is a general diagram of the cableway system, illustrating our carriage in operation.

Figure 2 is in part an elevation and in part a section, illustrating the carriage.

Figure 3 is a general section on a vertical longitudinal plane through the carriage, substantially on the line 3—3 of Figure 4.

Figure 4 is in general an end elevation of the carriage, with parts broken away and shown in section.

In a typical system as illustrated in Figure 1 a trackway cable 9 is extended between two spar trees 91 and 92, and along this trackway cable or skyline runs the carriage, generally designated by the numeral 1, supported by two trackway rollers or sheaves 10. The tong line 2 passes over a tong line sheave 3, carried in the carriage 1, and has a vertical run 21 and a lateral run 20. Connected to the lateral run at 22 is a slack puller line 4, which passes over a sheave 5 mounted upon the carriage, and thence extends in a run 41 back to the donkey. The donkey 6 is provided with drums 62, 64 and 67 to receive, respectively, the tong line 2, the run 41 of the slack puller line 4, and a haul-back line 7, which extends from the carriage to the spar 91 and thence back to the drum 67.

It will be obvious that with the carriage extended to the distance indicated in Figure 1, having been hauled out with the haul-back line 7 and with the tong line 2 slack and the tongs 23 drawn up to the carriage, it will be impossible to lower the tongs without hauling in the slack in the lateral run 20 of the tong line. Accordingly the run 41 of the slack puller line is drawn in, as is indicated in Figure 1 by the arrows, pulling slack in the tong line 2 and causing lowering of the vertical run 21 of the tong line. When sufficient length of tong line has been lowered to overcome the unsupported slack in the lateral run 20 of this line, it will, unless restrained, tend to run out and to drop. However, the present invention provides means to prevent this.

Thus the tong line sheave 3 is operatively connected to the slack puller line sheave 5, and preferably the two are identical in diameter, or nearly so, in such a way that the tong line can only rotate at about the same rate of speed as the slack puller line sheave 5, and the tong line 2 is held in such tractive engagement at all times with its sheave 3 that it cannot slide over and run past the sheave. To accomplish these ends the sheaves 3 and 5 may be made in effect integral, being connected by a neck or connection 35 (see Figure 4). Both may be and preferably are fixedly journaled in the carriage, which carriage consists chiefly of two cheek plates 11, spaced apart sufficiently to receive the sheaves 10 and 3. It is desired to point out that it is not essential that the tong line sheave 3 be fixedly journaled in the carriage, but this is to be preferred inasmuch as it simplifies considerably the construction of the carriage as a whole, and renders it more rugged. While the two sheaves may be made identical in diameter, it is preferable that the tong line sheave be slightly greater in diameter. Since this sheave 3 is turning at the same rate as the slack puller line sheave 5, the circumference of the tong line sheave 3 moves at a slightly greater circumferential speed than the circumference of the slack puller line sheave 5, and the result of this is to tend to take the belly out of the tong line between its point of connection at 22 and the sheave 3.

Further to accomplish the end in view we provide one or, preferably, two rollers 8, which engage at all times the tong line 2 as it passes over its sheave 3, and which hold the tong line in tractive engagement with its sheave. This may be accomplished by so mounting the rollers as to have limited movement substantially radially of the tong line sheave 3, and by supplying spring means to urge the rollers at all times towards the sheave, and into engagement with the tong line passing thereover. Thus the rollers 8 are carried upon spindles 80, received in a supporting block 81, disposed between the cheek plates, and guided by a pin 82 passing through a slot provided in the cheek plates and as shown in Figure 3. Springs 83 react between blocks 86 on the ends of the pin 82, and plate 84, backed by adjusting screws 85, to vary the pressure on the rollers 8. It may be pointed out here that the rollers can be removed, inspected and replaced by removing the pin 82, the pressure of the springs having been relieved by backing out the screws 85.

As indicated previously, the tong line sheave 3 and the slack puller sheave 5 are in effect integral, being connected by the connection 35, and these sheaves may be conveniently carried upon a through pin 53, whereby the sheaves are journaled in the cheek plates, through the medium, preferably, of ball or roller bearings 54. Preferably the slack puller line sheave 5 is duplicated at the opposite side of the carriage, so that the slack puller line may be led through whichever side is preferable for the particular operation or the particular set-up of the system. Instead of extending the slack puller line 4 only about the sheave 5 it may be extended over a guide sheave 50, likewise carried upon the outside of the cheek plates, above the sheave 5, whereby the slack puller line tends to lift that portion of the tong line between the connection 22 and the carriage. The slack puller line, which is considerably lighter than the tong line, and which is never heavily loaded, is shown as wrapped once and a fraction about the sheave 5, but this is largely a matter of choice, and it has been found satisfactory to pass it only over the sheave and not around it.

In pulling slack, the slack puller line relieves tension only in that portion of the tong line between the connection 22 and the carriage, usually a minor part of the lateral run 20 of the tong line. The slack puller line therefore assumes the tension of the remainder of the tong line's lateral run, and this acts as a resistance to prevent running out of the slack puller line. When the weight of the vertical run of the tong line overbalances the resistance of that portion of the lateral run of the tong line which lies between the carriage and the connection 22, there is a tendency for the tongs to drop, but since the slack puller line has the greater resistance of the major portion of the slack in the lateral run 20 of the tong line, and the tong line sheave 3 can only rotate at the same rate as the slack puller line sheave 5, and since the tong line is held so firmly in tractive engagement with its sheave 3 that it cannot slide over the sheave, it follows that the tong line's vertical run 21 can not drop, but continues to be lowered at the same rate as the slack puller line is hauled in against the resistance of the slack in the lateral run 20 of the tong line. Thus the tong line is lowered positively, and solely by attention to the hauling in of the slack puller line, at a rate which is controlled, and in accordance with or identical to the rate of haul-in of the slack puller line.

Since the tong line, bearing the load, should be immediately below the trackway cable 9, the sheaves 5 are placed outside the vertical plane through the trackway cable. Two such sheaves are provided because the donkey engine may in one installation be at one side of the head spar 92, and in another installation at the opposite side. When the carriage is close to the head spar, tension in the slack puller line 4, especially in its lateral run 41, tends to tilt the carriage, because of the unbalanced location of the point of tangency of this run 41 to its sheave. With such a point located well up on the carriage this tilting occurs through a considerable angle, the point of tangency tending to swing into the vertical plane through the trackway cable. This causes the lines 2 and 4 to run on and off their sheaves at one side, and not true, causing considerable wear through contact with the sheave flanges. By locating the point of tangency as low as possible, tilting occurs through a much smaller angle, and wear on the cables is appreciably lessened.

In order that the parts may be protected against breakage, and to avoid as far as possible engagement of the external parts with objects with which they may come in contact, as for instance when being dragged along the ground, we prefer to enclose, so far as possible, the sheaves 5, the guide sheaves 50, and the springs 83 and their associated parts, in fairings 12 and 13 which merge into the surface of the cheek plates, and whereby the carriage will tend to slide over objects with which it might otherwise engage and be blocked.

What we claim as our invention is:

1. In a cableway carriage, a sheave fixedly journaled in the carriage, over which sheave passes a hoisting line having a vertical run and a lateral run, a second sheave mounted in the carriage and operatively connected to the first sheave to rotate therewith, over which second sheave passes a slack puller line connected to the lateral run of the hoisting line, and means to press the hoisting line, as it runs over its sheave, into engagement with such sheave, thereby to effect positive downward movement of the vertical run of the hoisting line at a rate corresponding to the rate of movement of the slack puller line.

2. In a cableway carriage, a sheave supported in the carriage, over which passes a hoisting line having a vertical run and a lateral run, a second sheave supported in the carriage and operatively connected to the first sheave to rotate therewith, over which second sheave passes a slack puller line connected to the lateral run of the hoisting line, and means operable at all times to press the hoisting line into tractive engagement with its sheave, thereby to effect positive downward movement of the vertical run of the hoisting line at a rate corresponding to and substantially not in excess of the rate of movement of the slack puller line.

3. In a cableway carriage, a sheave mounted in the carriage, over which passes a hoisting line having a vertical run and a lateral run, a second sheave mounted in the carriage coaxially with and of substantially the same diameter as the first sheave, and secured to rotate with the first sheave, over which second sheave passes a slack puller line connected to the lateral run of the hoisting line, and means to hold the hoisting line at all times in tractive engagement with its sheave, thereby to effect positive downward movement of the vertical run of the hoisting line at a rate substantially identical to the rate of movement of the slack puller line.

4. In a cableway carriage, two coaxial and connected sheaves fixedly journaled in the carriage, over one of which passes the hoisting line having a vertical run and a lateral run, the second sheave receiving a slack puller line connected to the lateral run of the hoisting line, and a roller mounted in the carriage and spring-pressed at all times into engagement with the hoisting line as it passes over its sheave, to secure tractive engagement of such line with its sheave.

5. In a cableway carriage, a sheave fixedly journaled in the carriage, over which passes a hoisting line having a vertical run and a lateral run, a second sheave supported in the carriage and operatively connected to rotate with the first sheave, over which second sheave passes a slack puller line connected to the lateral run of the hoisting line, and a roller mounted in the carriage and spring-pressed at all times into engagement with the hoisting line as it passes over its sheave, to secure tractive engagement of such line with its sheave.

6. In a cableway carriage, two spaced cheek plates, two track sheaves mounted therebetween, a tong line sheave journaled between the two cheek plates, a slack puller line sheave mounted on the carriage externally of the cheek plates, and operatively connected to the tong line sheave to rotate therewith, a roller disposed between the cheek plates, adjacent the tong line sheave, means supporting and guiding said roller from the carriage for movement generally radially towards and from the latter sheave, and spring means urging said roller at all times into engagement with a tong line passing over such sheave, in turn to hold such line in tractive engagement with its sheave.

7. In a cableway carriage, two spaced cheek plates, two track sheaves mounted therebetween, a tong line sheave fixedly journaled between the cheek plates, below the track sheaves, a pair of rollers disposed between the cheek plates, each adjacent the tong line sheave, a common support for the two rollers guided for movement of the rollers towards and from the tong line sheave, spring means acting upon said support to urge the rollers at all times into engagement with a tong line passing over the tong line sheave, to press such line, in turn, into tractive engagement with its sheave, and a slack puller line sheave outside of the cheek plates, of substantially the same diameter as the tong line sheave and operatively connected to the latter to rotate therewith.

8. The combination of claim 7, including a pin engaging the roller support and projecting at each side of the carriage, the cheek plates being slotted for passage of said pin, and for its movement radially of the tong line sheave.

9. The combination of claim 7, including fairing means enclosing the slack puller line sheave and the spring means, and faired into the plane of the cheek plates, to minimize engagement of the carriage with objects it may contact.

10. In a cableway carriage, a tong line sheave supported in the carriage, means carried by the carriage and at all times disposed in position to hold the tong line, as it passes over said sheave, in tractive engagement with the sheave, and means on the carriage, operatively connected to the tong line sheave, and operable from a distant point, to rotate the sheave, and thus to lower the tong line, at a controlled rate.

ARTHUR E. HANSEN.
CHARLES W. SPIERING.